US010221350B2

(12) United States Patent
Shalagina et al.

(10) Patent No.: US 10,221,350 B2
(45) Date of Patent: Mar. 5, 2019

(54) TREATMENT FLUID (71) Applicant: SCHLUMBERGER TECHNOLOGY CORPORATION, Sugar Land, TX (US)

(72) Inventors: Anastasia Evgenyevna Shalagina, Koltsovo (RU); Diankui Fu, Kuala Lumpur (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/304,079

(22) PCT Filed: Apr. 15, 2014

(86) PCT No.: PCT/RU2014/000271
§ 371 (c)(1),
(2) Date: Oct. 14, 2016

(87) PCT Pub. No.: WO2015/160275
PCT Pub. Date: Oct. 22, 2015

(65) Prior Publication Data
US 2017/0037305 A1    Feb. 9, 2017

(51) Int. Cl.
*C09K 8/80* (2006.01)
*E21B 43/267* (2006.01)
(Continued)

(52) U.S. Cl.
CPC .............. *C09K 8/80* (2013.01); *C09K 8/885* (2013.01); *C09K 8/92* (2013.01); *E21B 43/26* (2013.01);
(Continued)

(58) Field of Classification Search
None
See application file for complete search history.

(56) References Cited

U.S. PATENT DOCUMENTS 3,850,247 A    11/1974  Tinsley
4,406,850 A     9/1983  Hills
(Continued)

FOREIGN PATENT DOCUMENTS

RU    2309971 C1    11/2007
WO    2004005671 A1   1/2004
(Continued)

OTHER PUBLICATIONS

Vasudevan et al., "Field Test of a Novel Low Viscosity Fracturing Fluid in the Lost Hills Fields, California", SPE 68854, SPE Western Regional Meeting, Bakersfield, California, Mar. 26-30, 2001, 11 pages.
(Continued)

*Primary Examiner* — Anuradha Ahuja
(74) *Attorney, Agent, or Firm* — Andrea E. Tran (57) ABSTRACT Fibers are employed to improve proppant transport in low viscosity treatment fluids. The treatment fluids employ fibers to inhibit proppant settling without an unacceptable bridging tendency. The fibers are preferably crimped staple fibers having 1-10 crimps/cm of fiber length, a crimp angle between 45 and 160 degrees and a mean diameter between 8 and 40 microns.

25 Claims, 10 Drawing Sheets (51) Int. Cl.
*C09K 8/92* (2006.01)
*C09K 8/88* (2006.01)
*E21B 43/26* (2006.01)

(52) U.S. Cl.
CPC ........ *E21B 43/267* (2013.01); *C09K 2208/08* (2013.01); *C09K 2208/28* (2013.01)

(56) References Cited

U.S. PATENT DOCUMENTS

| | | |
|---|---|---|
| 5,082,720 A | 1/1992 | Hayes |
| 5,330,005 A | 7/1994 | Roger et al. |
| 5,501,275 A | 3/1996 | Card et al. |
| 5,518,996 A | 5/1996 | Maroy et al. |
| 5,618,479 A | 4/1997 | Lijten et al. |
| 5,905,468 A | 5/1999 | Ikawa et al. |
| 6,419,019 B1 | 7/2002 | Palmer et al. |
| 7,044,220 B2 | 5/2006 | Nguyen et al. |
| 7,250,127 B2 | 7/2007 | Geck et al. |
| 7,275,596 B2 | 10/2007 | Willberg et al. |
| 7,281,581 B2 | 10/2007 | Nguyen et al. |
| 7,325,608 B2 | 2/2008 | Van Batenburg et al. |
| 7,380,601 B2 | 6/2008 | Willberg et al. |
| 7,581,590 B2 | 9/2009 | Lesko et al. |
| 7,784,541 B2 | 8/2010 | Hartman et al. |
| 7,789,146 B2 | 9/2010 | Panga et al. |
| 7,833,950 B2 | 11/2010 | Willberg et al. |
| 8,008,234 B2 | 8/2011 | Panga et al. |
| 8,061,424 B2 | 11/2011 | Willberg et al. |
| 8,066,068 B2 | 11/2011 | Lesko et al. |
| 8,119,574 B2 | 2/2012 | Panga et al. |
| 8,167,043 B2 | 5/2012 | Willberg et al. |
| 8,210,249 B2 | 7/2012 | Panga et al. |
| 8,227,026 B2 | 7/2012 | McDaniel et al. |
| 8,230,925 B2 | 7/2012 | Willberg et al. |
| 8,234,072 B2 | 7/2012 | Smith, Jr. et al. |
| 8,372,787 B2 | 2/2013 | Droger |
| 2002/0007169 A1* | 1/2002 | Graef .................. A61F 13/532 604/378 |
| 2004/0228890 A1 | 11/2004 | Blin et al. |
| 2008/0006413 A1 | 1/2008 | Le Gloahec et al. |
| 2008/0070810 A1 | 3/2008 | Mang |
| 2008/0135242 A1 | 6/2008 | Lesko et al. |
| 2008/0196896 A1 | 8/2008 | Bustos et al. |
| 2008/0236832 A1 | 10/2008 | Fu et al. |
| 2010/0263870 A1 | 10/2010 | Willberg et al. |
| 2010/0272994 A1 | 10/2010 | Carlson et al. |
| 2010/0288495 A1 | 11/2010 | Willberg et al. |
| 2010/0288500 A1 | 11/2010 | Carlson et al. |
| 2010/0300688 A1 | 12/2010 | Panga et al. |
| 2011/0098202 A1 | 4/2011 | James et al. |
| 2011/0240293 A1 | 10/2011 | Lesko et al. |
| 2012/0000641 A1 | 1/2012 | Panga et al. |
| 2012/0048555 A1 | 3/2012 | Hughes et al. |
| 2012/0067581 A1 | 3/2012 | Auzerais et al. |
| 2012/0111563 A1 | 5/2012 | Abad et al. |
| 2012/0129737 A1 | 5/2012 | Lesko et al. |
| 2012/0132421 A1 | 5/2012 | Loiseau et al. |
| 2012/0138296 A1 | 6/2012 | Panga et al. |
| 2012/0305245 A1 | 12/2012 | Loiseau et al. |
| 2012/0305254 A1 | 12/2012 | Chen et al. |
| 2012/0325472 A1 | 12/2012 | Litvinets et al. |
| 2013/0048285 A1 | 2/2013 | Boulard et al. |
| 2013/0066617 A1* | 3/2013 | Weng .................. E21B 43/26 703/10 |
| 2013/0134088 A1 | 5/2013 | Dahringer et al. |
| 2013/0233542 A1 | 9/2013 | Shampine et al. |
| 2015/0060063 A1* | 3/2015 | Miller .................. E21B 43/26 166/279 |
| 2016/0215604 A1* | 7/2016 | Potapenko ............ E21B 43/267 |
| 2017/0037305 A1 | 2/2017 | Shalagina et al. |
| 2017/0037306 A1 | 2/2017 | Shalagina et al. |

FOREIGN PATENT DOCUMENTS

| | | |
|---|---|---|
| WO | 2004037946 A1 | 5/2004 |
| WO | 2007086771 A1 | 8/2007 |
| WO | 2009005387 A1 | 1/2009 |
| WO | 2010075248 A1 | 7/2010 |
| WO | 2011050046 A1 | 4/2011 |
| WO | 2012054456 A1 | 4/2012 |
| WO | 2013085412 A1 | 6/2013 |
| WO | 2014039216 A1 | 3/2014 |

OTHER PUBLICATIONS

Engels et al., "A Mechanical Methodology of Improved Proppant Transport in Low-Viscosity Fluids: Application of a Fiber-Assisted Transport Technique in East Texas", SPE 91434, 2004 SPE Eastern Regional Meeting, Charleston, West Virginia, Sep. 15-17, 2004, 11 pages.

International Search Report and Written Opinion issued in International Patent Application No. PCT/RU2014/000837 dated Mar. 5, 2015; 8 pages.

International Search Report issued in International Patent Application No. PCT/RU2014/000271 dated Jan. 22, 2015; 3 pages.

Hager et al., "A revolutionary product concept: Silicone gum pellets as additives for thermoplastics", Society of Plastics Engineers International Conference on Polyolefins 2005: The Challenges of Globalization, vol. 2, 2005, pp. 604-613.

Written Opinion issued in International Patent Application No. PCT/RU2014/000271 dated Jan. 22, 2015; 4 pages.

International Search Report and Written Opinion issued in International Patent Application No. PCT/RU2014/000838 dated Aug. 13, 2015; 7 pages.

\* cited by examiner

TREATMENT FLUID

RELATED APPLICATIONS

This application is a 371 National Phase Application of International Patent Application No. PCT/RU2014/000271, filed Apr. 15, 2014. The disclosure of the priority application is hereby incorporated by reference herein in its entirety.

BACKGROUND

The statements in this section merely provide background information related to the present disclosure and may not constitute prior art.

Fibers have been used in some hydraulic fracturing treatments where a viscosified treatment fluid is used to carry proppant and/or where bridging contributed to by the fiber is desirable, e.g., in diversion applications. However, with low viscosity fluids such as, for example, treatments using slickwater (also sometimes referred to as waterfrac) to fracture shale or tight gas formations, bridging may be undesirable and narrow fracture widths would further exacerbate the bridging tendencies of fiber. Accordingly, there is a demand for further improvements in this area of technology.

SUMMARY

In some embodiments according to the disclosure herein, methods and systems using fibers are employed in low viscosity treatment fluids to inhibit proppant settling while obtaining suitable resistance to bridging, e.g., without bridging in some embodiments.

In some embodiments, a well treatment fluid may comprise a low viscosity carrier fluid, e.g., having a viscosity less than 50 mPa-s at a shear rate of $170 \text{ s}^{-1}$ and a temperature of 25° C., proppant dispersed in the carrier fluid, and fiber dispersed in the carrier fluid. Such fiber may be present in some embodiments in an amount effective to inhibit settling of the proppant, for example, in a static proppant settling test or in a large slot flow test without bridging at a flow rates equal to and greater than 10 cm/s.

In some embodiments, a method to treat a subterranean formation penetrated by a wellbore may comprise injecting a treatment fluid into the subterranean formation to form a hydraulic fracture system, the treatment fluid comprises: a low viscosity carrier fluid, proppant dispersed in the carrier fluid, and fiber dispersed in the carrier fluid. Such fiber may be present in an amount effective to inhibit settling of the proppant; and the method may include maintaining a rate of the injection to avoid bridging in the wellbore.

In some embodiments, a method to inhibit proppant settling in a low viscosity treatment fluid circulated in a wellbore may comprise dispersing fiber in the carrier fluid in an amount effective to inhibit settling of the proppant, and maintaining a rate of the circulation to avoid bridging in the wellbore.

In some embodiments, a system to treat a subterranean formation may comprise a subterranean formation penetrated by a wellbore; a treatment fluid injection unit to supply a treatment fluid stage, which comprises proppant in a low viscosity carrier fluid, to the formation above a fracturing pressure to form a fracture system; and a fiber supply unit to introduce fiber into the treatment fluid. In embodiments, the fiber is introduced into the treatment fluid in an amount suitable to inhibit proppant settling and/or the supply of the treatment fluid stage to the formation is at a flow rate sufficient to avoid inducing bridging.

BRIEF DESCRIPTION OF THE DRAWINGS

These and other features and advantages will be better understood by reference to the following detailed description when considered in conjunction with the accompanying drawings.

DETAILED DESCRIPTION

For the purposes of promoting an understanding of the principles of the disclosure, reference will now be made to some illustrative embodiments of the current application. Like reference numerals used herein refer to like parts in the various drawings. Reference numerals without suffixed letters refer to the part(s) in general; reference numerals with suffixed letters refer to a specific one of the parts.

As used herein, "embodiments" refers to non-limiting examples of the application disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

It should be understood that, although a substantial portion of the following detailed description may be provided in the context of oilfield fracturing operations, other oilfield operations such as cementing, gravel packing, etc., or even non-oilfield well treatment operations, can utilize and benefit as well from the instant disclosure.

In some embodiments, a treatment fluid comprises a low viscosity carrier fluid having a low viscosity, proppant dispersed in the carrier fluid, and fiber dispersed in the carrier fluid. As used herein, a "low viscosity" fluid refers to one having a viscosity less than 50 mPa-s at a shear rate of 170 s$^{-1}$ and a temperature of 25° C. In some embodiments, the treatment fluid comprises proppant particles and fibers dispersed in a carrier fluid.

In some embodiments, the treatment fluid comprises from 0.01 to 1 kg/L of the proppant based on the total volume of the carrier fluid (from 0.1 to 8.3 ppa, pounds proppant added per gallon of carrier fluid), e.g., from 0.048 to 0.6 kg/L of the proppant based on the total volume of the carrier fluid (0.4 to 5 ppa), or from 0.12 to 0.48 kg/L of the proppant based on the total volume of the carrier fluid (from 1 to 4 ppa). As used herein, proppant loading is specified in weight of proppant added per volume of carrier fluid, e.g., kg/L (ppa=pounds of proppant added per gallon of carrier fluid). Exemplary proppants include ceramic proppant, sand, bauxite, glass beads, crushed nuts shells, polymeric proppant, rod shaped, and mixtures thereof.

In some embodiments, the fiber is dispersed in the carrier fluid in an amount effective to inhibit settling of the proppant. This settling inhibition may be evidenced, in some embodiments, for example, in a static proppant settling test at 25° C. for 90 minutes. The proppant settling test in some embodiments involves placing the fluid in a container such as a graduated cylinder and recording the upper level of dispersed proppant in the fluid. The upper level of dispersed proppant is recorded at periodic time intervals while maintaining settling conditions. The proppant settling fraction is calculated as:

$$\text{Proppant settling} = \frac{[\text{initial proppant level } (t=0)] - [\text{upper proppant level at time } n]}{[\text{initial proppant level } (t=0)] - [\text{final proppant level } (t=\infty)]}$$

The fiber inhibits proppant settling if the proppant settling fraction for the fluid containing the proppant and fiber has a lower proppant settling fraction than the same fluid without the fiber and with proppant only. In some embodiments, the proppant settling fraction of the treatment fluid in the static proppant settling test after 90 minutes is less than 50%, e.g., less than 40%.

Figure 1A:
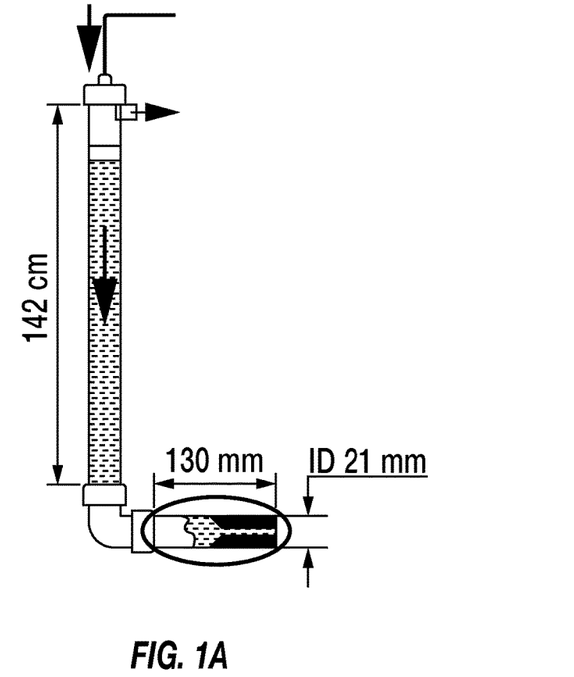
FIG. 1A schematically illustrates a bridging test apparatus according to embodiments.
Figure 1B:
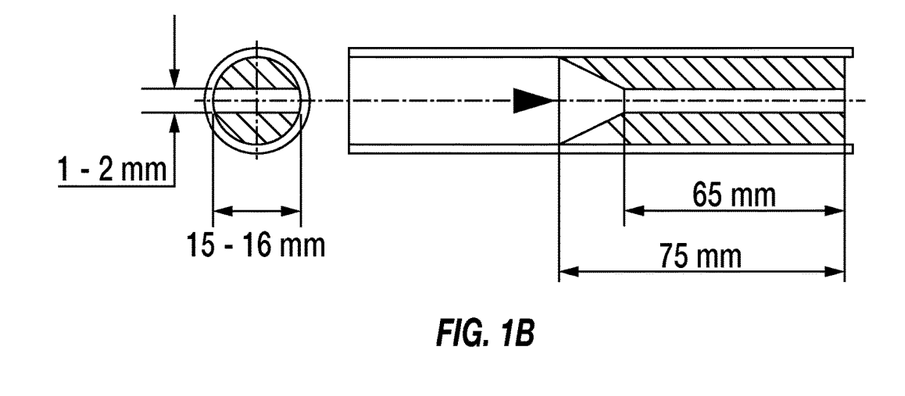
FIG. 1B schematically illustrates an enlarged detail of the slot design in the apparatus of FIG. 1A.

In some embodiments, the fiber is dispersed in the carrier fluid in an amount insufficient to cause bridging, e.g., as determined in a small slot test comprising passing the treatment fluid comprising the carrier fluid and the fiber without proppant at 25° C. through a bridging apparatus such as that shown in FIGS. 1A and 1B comprising a 1.0-1.8 mm slot that is 15-16 mm wide and 65 mm long at a flow rate equal to 15 cm/s, or at a flow rate equal to 10 cm/s.

In some embodiments the fiber is dispersed in the carrier fluid in both an amount effective to inhibit settling of the proppant and in an amount insufficient to cause bridging, wherein settling and bridging are determined by comparing proppant accumulation in a narrow fracture flow test comprising pumping the treatment fluid at 25° C. through a 2 mm slot measuring 3 m long by 0.5 m high for 60 seconds at a flow velocity of 65 cm/s, or at a flow velocity of 20 cm/s, relative to a reference fluid containing the carrier fluid and proppant only without the fiber. In the narrow fracture flow test, the slot may be formed of flow cells with transparent windows to observe proppant settling at the bottom of the cells. Proppant settling is inhibited if testing of the fluid with the proppant and fiber results in measurably less proppant settling than the same fluid and proppant mixture without the fiber at the same testing conditions. Bridging is likewise observed in the narrow fracture flow test as regions exhibiting a reduction of fluid flow also resulting in proppant accumulation in the flow cells.

In some embodiments, the treatment fluid comprises from 1.2 to 12 g/L of the fibers based on the total volume of the carrier fluid (from 10 to 100 ppt, pounds per thousand gallons of carrier fluid), e.g., less than 4.8 g/L of the fibers based on the total volume of the carrier fluid (less than 40 ppt) or from 1.2 or 2.4 to 4.8 g/L of the fibers based on the total volume of the carrier fluid (from 10 or 20 to 40 ppt).

In some embodiments, the fibers are crimped staple fibers. In some embodiments, the crimped fibers comprise from 1 to 10 crimps/cm of length, a crimp angle from 45 to 160 degrees, an average extended length of fiber of from 4 to 15 mm, and/or a mean diameter of from 8 to 40 microns, or 8 to 12, or 8 to 10, or a combination thereof. In some embodiments, the fibers comprise low crimping equal to or less than 5 crimps/cm of fiber length, e.g., 1-5 crimps/cm.

Depending on the temperature that the treatment fluid will encounter, especially at downhole conditions, the fibers may be chosen depending on their resistance or degradability at the envisaged temperature. In the present disclosure, the terms "low temperature fibers", "mid temperature fibers" and "high temperature fibers" may be used to indicate the temperatures at which the fibers may be used for delayed degradation, e.g., by hydrolysis, at downhole conditions. Low temperatures are typically within the range of from about 60° C. (140° F.) to about 93° C. (200° F.); mid temperatures typically from about 94° C. (201° F.) to about 149° C. (300° F.); and high temperatures typically about 149.5° C. (301° F.) and above, or from about 149.5° C. (301° F.) to about 204° C. (400° F.).

In some embodiments, the fibers comprise polyester. In some embodiments, the polyester undergoes hydrolysis at a low temperature of less than about 93° C. as determined by slowly heating 10 g of the fibers in 1 L deionized water until the pH of the water is less than 3, and in some embodiments, the polyester undergoes hydrolysis at a moderate temperature of between about 93° C. and 149° C. as determined by slowly heating 10 g of the fibers in 1 L deionized water until the pH of the water is less than 3, and in some embodiments, the polyester undergoes hydrolysis at a high temperature greater than 149° C., e.g., between about 149.5° C. and 204° C. In some embodiments, the polyester is selected from the group consisting of polylactic acid, polyglycolic acid, copolymers of lactic and glycolic acid, and combinations thereof.

In some embodiments, the fiber is selected from the group consisting of polylactic acid (PLA), polyglycolic acid (PGA), polyethylene terephthalate (PET), polyester, polyamide, polycaprolactam and polylactone, poly(butylene) succinate, polydioxanone, nylon, glass, ceramics, carbon (including carbon-based compounds), elements in metallic form, metal alloys, wool, basalt, acrylic, polyethylene, polypropylene, novoloid resin, polyphenylene sulfide, polyvinyl chloride, polyvinylidene chloride, polyurethane, polyvinyl alcohol, polybenzimidazole, polyhydroquinone-diimidazopyridine, poly(p-phenylene-2,6-benzobisoxazole), rayon, cotton, cellulose and other natural fibers, rubber, and combinations thereof.

In some embodiments, the carrier fluid may be slickwater, or may be brine. In some embodiments, the carrier fluid may comprise a linear gel, e.g., water soluble polymers, such as hydroxyethylcellulose (HEC), guar, copolymers of polyacrylamide and their derivatives, e.g., acrylamido-methyl-propane sulfonate polymer (AMPS), or a viscoelastic surfactant system, e.g., a betaine, or the like. When a polymer present, it may be at a concentration below 1.92 g/L (16 ppt), e.g. from 0.12 g/L (1 ppt) to 1.8 g/L (15 ppt). When a viscoelastic surfactant is used, it may be used at a concentration below 10 ml/L, e.g. 2.5 ml/L to 5 ml/L.

In some embodiments the treatment fluid may include a fluid loss control agent, e.g., fine solids less than 10 microns, or ultrafine solids less than 1 micron, or 30 nm to 1 micron. According to some embodiments, the fine solids are fluid loss control agents such as γ-alumina, colloidal silica, $CaCO_3$, $SiO_2$, bentonite etc.; and may comprise particulates with different shapes such as glass fibers, flocs, flakes, films; and any combination thereof or the like. Colloidal silica, for example, may function as an ultrafine solid loss control agent, depending on the size of the micropores in the formation, as well as a gellant and/or thickener in any associated liquid or foam phase.

In some embodiments, the carrier fluid comprises brine, e.g., sodium chloride, potassium bromide, ammonium chloride, potassium chloride, tetramethyl ammonium chloride and the like, including combinations thereof. In some embodiments the fluid may comprise oil, including synthetic oils, e.g., in an oil based or invert emulsion fluid.

In some embodiments, the treatment fluid comprises a friction reducer, e.g., a water soluble polymer. The treatment fluid may additionally or alternatively include, without limitation, clay stabilizers, biocides, crosslinkers, breakers, corrosion inhibitors, temperature stabilizers, surfactants, and/or proppant flowback control additives. The treatment fluid may further include a product formed from degradation, hydrolysis, hydration, chemical reaction, or other process that occur during preparation or operation.

In some embodiments, a method to treat a subterranean formation penetrated by a wellbore, comprises injecting the treatment fluid described herein into the subterranean formation to form a hydraulic fracture system, and maintaining a rate of the injection to avoid bridging in the wellbore, such as, for example, as determined in a bridging testing apparatus without proppant.

In some embodiments, the method may comprise injecting a pre-pad, pad, tail or flush stage or a combination thereof. In some embodiments, the treatment fluid used in the method comprises the treatment fluid described above.

The treatment fluid may be prepared using blenders, mixers and the like using standard treatment fluid preparation equipment and well circulation and/or injection equipment. In some embodiments, a method is provided to inhibit proppant settling in a treatment fluid circulated in a wellbore, wherein the treatment fluid comprises the proppant dispersed in a low viscosity carrier fluid. The method comprises dispersing fiber in the carrier fluid in an amount effective to inhibit settling of the proppant, such as, for example, as determined in the small slot test, and maintaining a rate of the circulation to avoid bridging in the wellbore, such as, for example, as determined in a bridging testing apparatus without proppant and/or in the narrow fracture flow test. In some embodiments, the treatment fluid further comprises a friction reducer.

According to some embodiments, the proppant stage(s) may be injected into a fracture system using any one of the available proppant placement techniques, including heterogeneous proppant placement techniques, wherein the low viscosity treatment fluid herein is used in place of or in addition to any proppant-containing treatment fluid, such as, for example, those disclosed in U.S. Pat. Nos. 3,850,247; 5,330,005; 7,044,220; 7,275,596; 7,281,581; 7,325,608; 7,380,601; 7,581,590; 7,833,950; 8,061,424; 8,066,068; 8,167,043; 8,230,925; 8,372,787; US 2008/0236832; US 2010/0263870; US 2010/0288495; US 2011/0240293; US 2012/0067581; US 2013/0134088; EP 1556458; WO 2007/086771; SPE 68854: Field Test of a Novel Low Viscosity Fracturing Fluid in the Lost Hills Fields, Calif.; and SPE 91434: A Mechanical Methodology of Improved Proppant Transport in Low-Viscosity Fluids: Application of a Fiber-Assisted Transport Technique in East Texas; each of which is hereby incorporated herein by reference in its entirety.

Accordingly, the present disclosure provides the following embodiments, among others:

E1. A treatment fluid, comprising:
   a low viscosity carrier fluid having a viscosity less than 50 mPa-s at a shear rate of 170 $s^{-1}$ and a temperature of 25° C.;
   proppant dispersed in the carrier fluid; and
   fiber dispersed in the carrier fluid.

E2. The treatment fluid of Embodiment E1, wherein the carrier fluid is slickwater.

E3. The treatment fluid of Embodiment E1 or Embodiment E2, wherein the carrier fluid comprises brine.

E4. The treatment fluid of any one of Embodiments E1 to E3, comprising from 0.06 to 1 kg/L of the proppant based on the total volume of the carrier fluid (from 0.5 to 8.3 ppa, pounds proppant added per gallon of carrier fluid).

E5. The treatment fluid of any one of Embodiments E1 to E4, comprising from 0.12 to 0.48 kg/L of the proppant based on the total volume of the carrier fluid (from 1 to 4 ppa).

E6. The treatment fluid of any one of Embodiments E1 to E5, wherein the fiber is dispersed in the carrier fluid in an amount effective to inhibit settling of the proppant.

E7. The treatment fluid of any one of Embodiments E1 to E6, comprising from 1.2 to 12 g/L of the fibers based on the total volume of the carrier fluid (from 10 to 100 ppt, pounds per thousand gallons of carrier fluid).

E8. The treatment fluid of any one of Embodiments E1 to E7, comprising less than 4.8 g/L of the fibers based on the total volume of the carrier fluid (less than 40 ppt), or from 1.2 g/L to 4.8 g/L (10 to 40 ppt) of the fibers.

E9. The treatment fluid of any one of Embodiments E1 to E8, wherein the fiber is dispersed in the carrier fluid in an amount effective to inhibit settling of the proppant, wherein the effective amount is determined by a static settling test in cylinder at 25° C. for 90 minutes.

E10. The treatment fluid of Embodiment E9, wherein the fiber is dispersed in the carrier fluid in an amount insufficient to cause bridging.

E11. The treatment fluid of Embodiment E9 or Embodiment E10, wherein the fiber is dispersed in the carrier fluid in an amount effective to inhibit settling of the proppant and in an amount insufficient to cause bridging.

E12. The treatment fluid of any one of Embodiments E9 to E11, wherein the fiber is dispersed in the carrier fluid in an amount effective to inhibit settling of the proppant and in an amount insufficient to cause bridging as determined in a small slot test comprising passing the treatment fluid comprising the carrier fluid and the fiber without proppant at 25° C. through a bridging apparatus comprising a 1.0-1.8 mm slot that is 15-16 mm wide and 65 mm long at a flow rate equal to 15 cm/s.

E13. The treatment fluid of any one of Embodiments E9 to E12, wherein the fiber is dispersed in the carrier fluid in an amount effective to inhibit settling of the proppant and in an amount insufficient to cause bridging as determined in a small slot test comprising passing the treatment fluid comprising the carrier fluid and the fiber without proppant at 25° C. through a bridging apparatus comprising a 1.0-1.8 mm slot that is 15-16 mm wide and 65 mm long at a flow rate equal to 10 cm/s.

E14. The treatment fluid of any one of Embodiments E1 to E13, wherein the effective amount of the fiber to inhibit settling of the proppant is determined by comparing proppant accumulation in a narrow fracture flow test comprising pumping the treatment fluid at 25° C. through a 2 mm slot measuring 3 m long by 0.5 m high for 60 seconds at a flow velocity of 65 cm/s, relative to a reference fluid containing the carrier fluid and proppant only without the fiber.

E15. The treatment fluid of any one of Embodiments E1 to E14, wherein the effective amount of the fiber to inhibit settling of the proppant is determined by comparing proppant accumulation in a narrow fracture flow test comprising pumping the treatment fluid at 25° C. through a 2 mm slot measuring 3 m long by 0.5 m high for 60 seconds at a flow velocity of 20 cm/s, relative to a reference fluid containing the carrier fluid and proppant only without the fiber.

E16. The treatment fluid of any one of Embodiments E1 to E15, wherein the fibers are crimped staple fibers.

E17. The treatment fluid of any one of Embodiments E1 to E16, wherein the crimped staple fibers comprise from 1 to 10 crimps/cm of length, a crimp angle from 45 to 160 degrees, an average extended length of fiber of from 3 to 15 mm, a mean diameter of from 8 to 40 microns, or a combination thereof.

E18. The treatment fluid of any one of Embodiments E1 to E17, wherein the crimped staple fibers comprise an average extended length of fiber of from 8 to 12 mm.

E19. The treatment fluid of any one of Embodiments E1 to E18, wherein the crimped staple fibers comprise an average extended length of fiber of from 8 to 10 mm.

E20. The treatment fluid of any one of Embodiments E1 to E19, wherein the fibers comprise crimping equal to or less than 5 crimps/cm of fiber length.

E21. The treatment fluid of any one of Embodiments E1 to E20, wherein the fibers comprise polyester.

E22. The treatment fluid of Embodiment E21, wherein the polyester undergoes hydrolysis at a low temperature of less than 93° C. as determined by heating 10 g of the fibers in 1 L deionized water until the pH of the water is less than 3.

E23. The treatment fluid of Embodiment E21, wherein the polyester undergoes hydrolysis at a moderate temperature of between 93° C. and 149° C. as determined by heating 10 g of the fibers in 1 L deionized water until the pH of the water is less than 3.

E24. The treatment fluid of Embodiment E21, wherein the polyester is selected from the group consisting of polylactic acid, polyglycolic acid, copolymers of lactic and glycolic acid, and combinations thereof.

E25. The treatment fluid of any one of Embodiments E1 to E24, wherein the fiber is selected from the group consisting of polylactic acid (PLA), polyglycolic acid (PGA), polyethylene terephthalate (PET), polyester, polyamide, polycaprolactam and polylactone, poly(butylene) succinate, polydioxanone, glass, ceramics, carbon (including carbon-based compounds), elements in metallic form, metal alloys, wool, basalt, acrylic, polyethylene, polypropylene, novoloid resin, polyphenylene sulfide, polyvinyl chloride, polyvinylidene chloride, polyurethane, polyvinyl alcohol, polybenzimidazole, polyhydroquinone-diimidazopyridine, poly(p-phenylene-2,6-benzobisoxazole), rayon, cotton, cellulose and other natural fibers, rubber, and combinations thereof.

E26. The treatment fluid of any one of Embodiments E1 to E25, further comprising a friction reducer.

E27. The treatment fluid of any one of Embodiments E1 to E26, wherein the treatment fluid comprises a proppant settling fraction in a static settling test in cylinder at 25° C. for 90 minutes of less than 50%, or of less than 40%.

E28. A method to treat a subterranean formation penetrated by a wellbore, comprising:
injecting the treatment fluid of any one of Embodiments E1 to E27 into the subterranean formation to form a hydraulic fracture system; and
maintaining a rate of the injection to avoid bridging in the wellbore.

E29. The method of Embodiment E28, further comprising injecting a pre-pad, pad, tail or flush stage or a combination thereof.

E30. The method of Embodiment E28 or E29, wherein the fibers comprise polyester and further comprising hydrolyzing the fibers downhole after the injection.

E31. A method to inhibit proppant settling in a treatment fluid circulated in a wellbore, the treatment fluid comprising the proppant dispersed in a low viscosity carrier fluid having a viscosity less than 50 mPa-s at a shear rate of 170 $s^{-1}$ and a temperature of 25° C., comprising:
dispersing fiber in the carrier fluid in an amount effective to inhibit settling of the proppant to form the treatment fluid according to of any one of Embodiments E1 to E27; and
maintaining a rate of the circulation to avoid bridging in the wellbore.

E32. A system to treat a subterranean formation, comprising:
a subterranean formation penetrated by a wellbore;
a treatment fluid injection unit to supply a treatment fluid stage, comprising the treatment fluid according to of any one of Embodiments E1 to E27, to the formation above a fracturing pressure to form a fracture system; and
a fiber supply unit to introduce the fiber into the treatment fluid.

EXAMPLES

In the following examples, slickwater and low viscosity linear guar fluids were prepared from tap water. The slickwater contained 1 mL/L (1 gpt) of a concentrated friction reducer solution. Then, depending on the test, two types of linear guar fluids were prepared:
In the model static settling test in cylinder used in example 1, a fluid A was used, it contained linear guar fluid containing 5.4 g/L (45 ppt) guar and 0.48 kg/L (4 ppa) of 12/18 mesh proppant were used, these proppant was obtained from CARBOPROP™ from Carbo ceramics (Houston, Tex., USA);

In the settling test in narrow slot used in example 2, a fluid B was used, it contained a linear gel containing 2.4 g/L (20 ppt) guar and 0.12 to 0.24 kg/L (2 ppa) of 40/70 mesh proppant were used, these proppant were BADGER™ sand from Badger Mining Corporation (Berlin, Wis., USA);

The fibers used in the following examples were polylactic acid fibers that were obtained from Trevira GmbH (Germany). Both mid and low temperature resistant fibers were used, the mid temperature fibers generally being useful in treatments with a formation temperature in the range of 94–149° C., and the low temperature resistant fibers at 60-93° C., of those tested in these examples. The fibers were straight (uncrimped), or low crimp (4-5 crimps/cm) or high crimp (>5 crimps/cm, e.g., 8-15 crimps/cm). In the fibers evaluated in these examples, the low crimp fibers performed well in terms of bridging resistance and inhibiting proppant settling at lower fiber loadings. Fibers with diameters from 8 to 13 microns and lengths from 3 to 12 mm were evaluated, and of those tested in these examples, the fibers with a diameter of 8-9.5 microns and a length of 6 mm performed well in terms of bridging resistance and inhibiting proppant settling at lower fiber loadings. The characteristics of the fibers used and other examples of suitable fibers in some embodiments are identified in Table 1.

TABLE 1

Fibers used in experimental tests and other exemplary fibers.

| Fiber ID | Hydrolysis Range | T Crimps/cm | Diameter, microns | Length, mm |
|---|---|---|---|---|
| NF1 | Mid | 0 | 13 | 6 |
| NF2 | Low | 0 | 12 | 6 |
| CF1 | Mid | Low | 10 | 4 |
| CF2 | Mid | Low | 10 | 6 |
| CF3 | Mid | Low | 10 | 8 |
| CF4 | Mid | Low | 10 | 12 |
| CF5 | Mid | Low | 12 | 4 |
| CF6 | Mid | Low | 12 | 6 |
| CF7 | Mid | Low | 12 | 8 |
| CF8 | Mid | Low | 12 | 12 |
| CF9 | Low | Low | 10 | 4 |
| CF10 | Low | Low | 10 | 6 |
| CF11 | Low | Low | 10 | 8 |
| CF12 | Low | Low | 10 | 12 |
| CF13 | Low | High | 10 | 4 |
| CF14 | Low | High | 10 | 6 |
| CF15 | Low | High | 10 | 8 |
| CF16 | Low | High | 10 | 12 |
| CF17 | Low | Low | 12 | 4 |
| CF18 | Low | Low | 12 | 6 |
| CF19 | Low | Low | 12 | 8 |
| CF20 | Low | Low | 12 | 12 |
| CF21 | Low | High | 12 | 4 |
| CF22 | Low | High | 12 | 6 |
| CF23 | Low | High | 12 | 8 |
| CF24 | Low | High | 12 | 12 |

FIGS. 2 to 9 are the results of test obtained with the proppant settling cylinder test.

The model proppant settling test involved placing the fluid in a graduated cylinder and recording the upper level of dispersed proppant in the fluid. The upper level of dispersed proppant was recorded at periodic time intervals, e.g., 0, 10, 30, 60, 90 and 120 minutes while maintaining settling conditions. The proppant settling fraction was calculated as:

$$\text{Proppant settling} = \frac{[\text{initial proppant level } (t = 0)] - [\text{upper proppant level at time } n]}{[\text{initial proppant level } (t = 0)] - [\text{final proppant level } (t = \infty)]}$$

Concerning the bridging screen test apparatus used is seen in FIGS. 1A and 1B. The fluid being tested was pumped through the apparatus at a flow rate of 10-500 mL/min for a period of at least 1 minute (at the end of the time period the total volume of fluid pumped was 500 mL). Formation of a fiber plug in the slot (1-2 mm) was indicated by a pressure rise. Bridging tests using the test apparatus of FIGS. 1A-1B were conducted without proppant unless otherwise noted. The fluid was recorded as negative for bridge formation if no plug was formed.

A narrow fracture flow test apparatus was also employed for more in depth analysis. The narrow fracture flow test apparatus employed parallel glass panes with a length of 3 m, height of 0.5 m and width of 2 mm for visualization of the fluid and proppant at a flow rate up to 50 L/min. The narrow fracture flow tests were run with L-, T- and X-shape slot orientation.

Example 1

Proppant Settling

In this example, fluid A was used. The tests were made to compare one fiber with another, and estimate the behavior of any new fiber as a proppant settling inhibitor. The tests were made in a linear gel since settling test in a slickwater type of fluid may not be representative as the settling may occur immediately.

Figure 2:
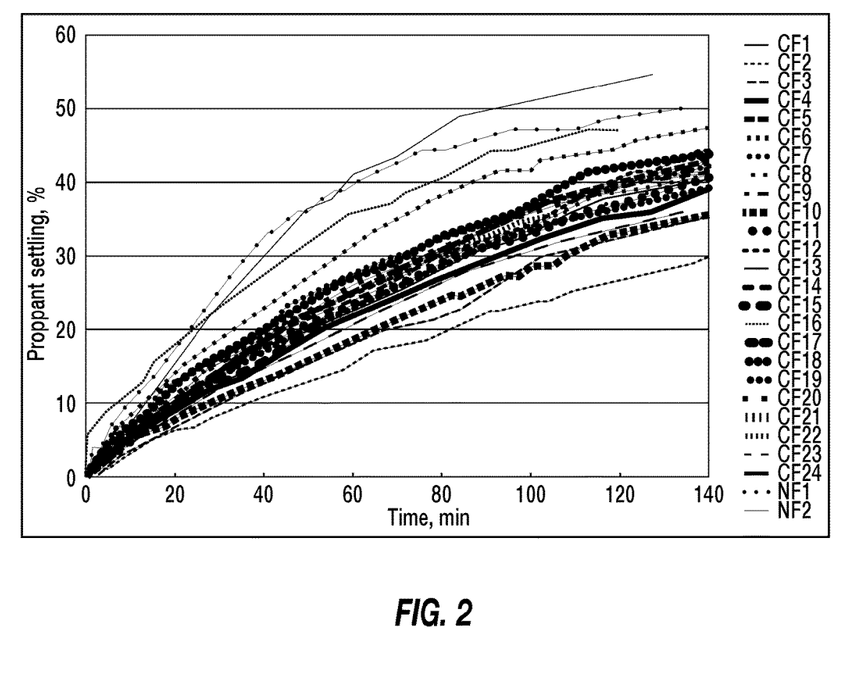
FIG. 2 schematically graphs the proppant settling in a treatment fluid with various fibers.

A fluid with 0.48 g/L of fibers NF1-NF2 and CF1-CF24 with 0.48 kg/L (4 ppa) proppant was prepared. The data which are shown in FIG. 2 indicate the crimped fibers inhibited proppant settling better than the uncrimped fibers.

Figure 3:
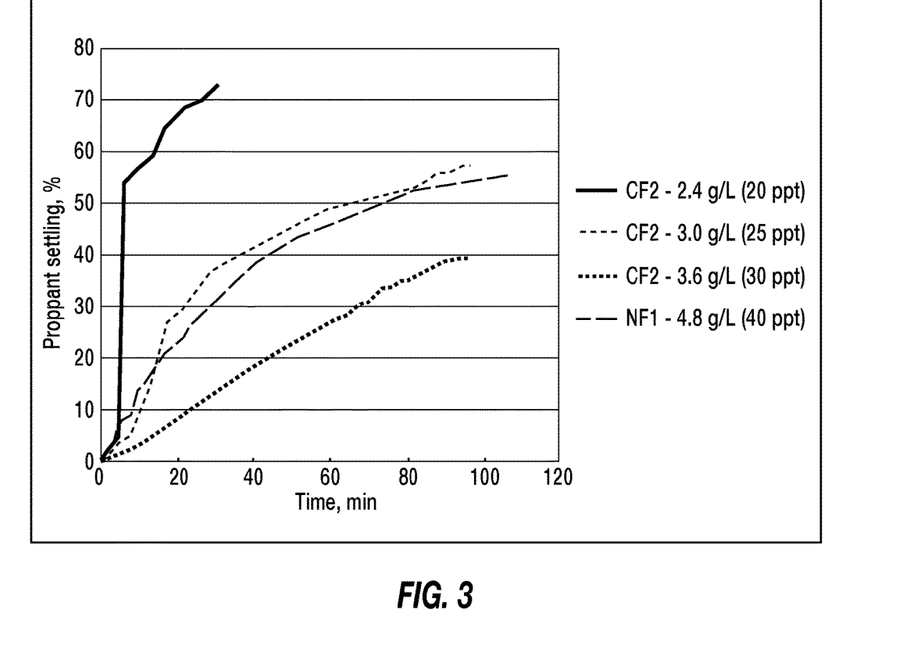
FIG. 3 schematically graphs the effect of fiber loading on proppant settling in a treatment fluid with crimped mid temperature fibers.
Figure 4:
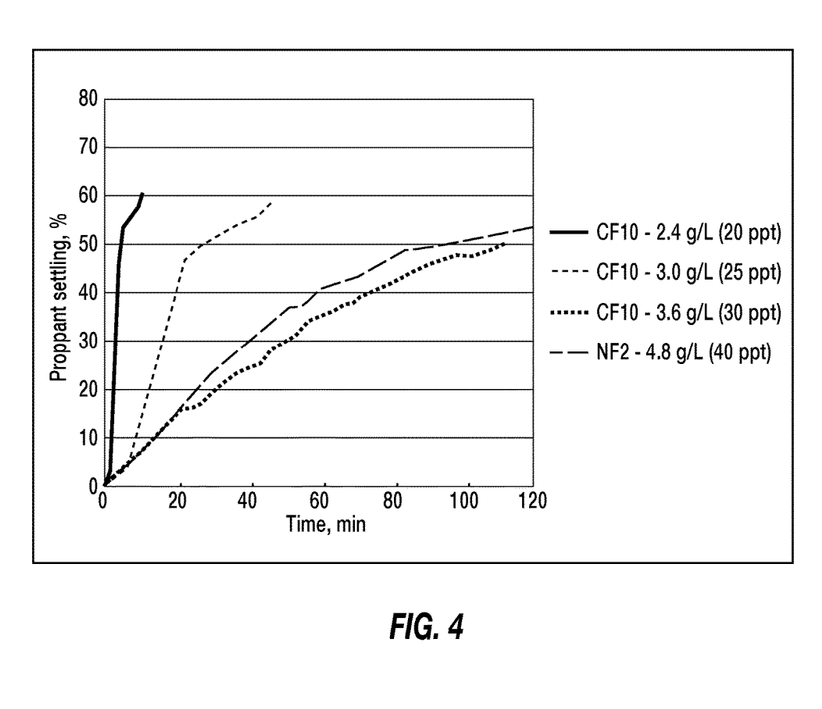
FIG. 4 schematically graphs the effect of fiber loading on proppant settling in a treatment fluid with crimped low temperature fibers.

The qualitative results in FIGS. 3 and 4 indicate that the mid temperature fiber CF2 (10 microns/6 mm) and the low temperature fiber CF10 (10 microns/6 mm) indicate the fiber loading was reduced by 25% using the crimped fibers in place of the uncrimped fibers NF1 and NF2, respectively.

Figure 5:
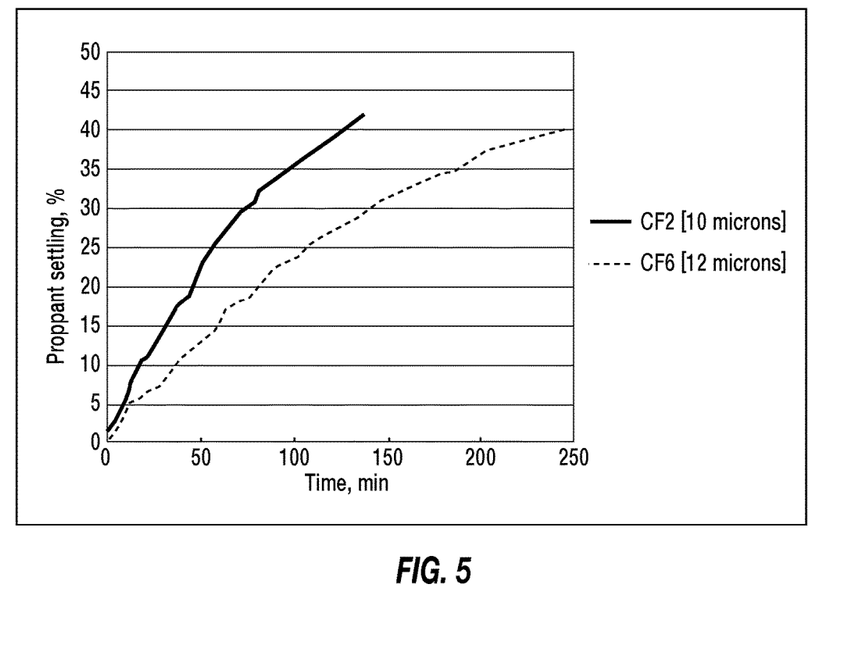
FIG. 5 schematically graphs the effect of fiber diameter on proppant settling in a treatment fluid with crimped mid temperature fibers.
Figure 6:
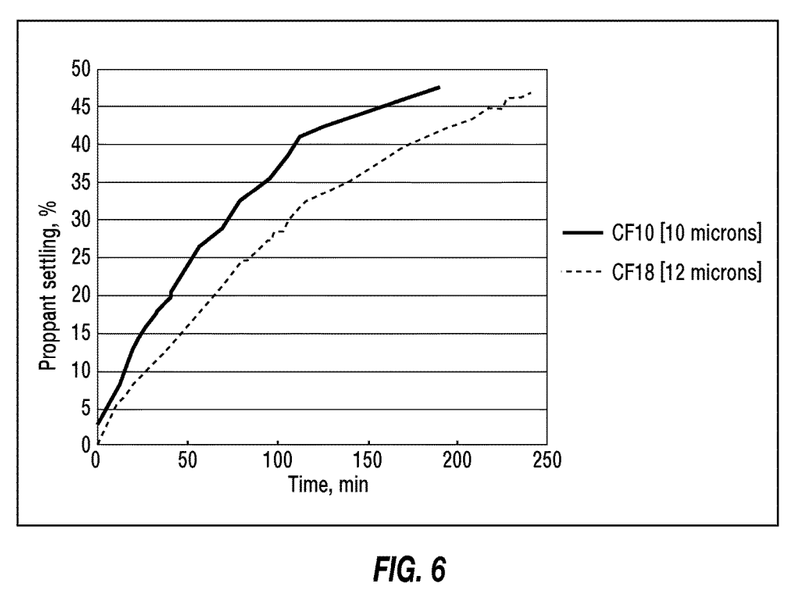
FIG. 6 schematically graphs the effect of fiber diameter on proppant settling in a treatment fluid with crimped low temperature fibers.
Figure 7:
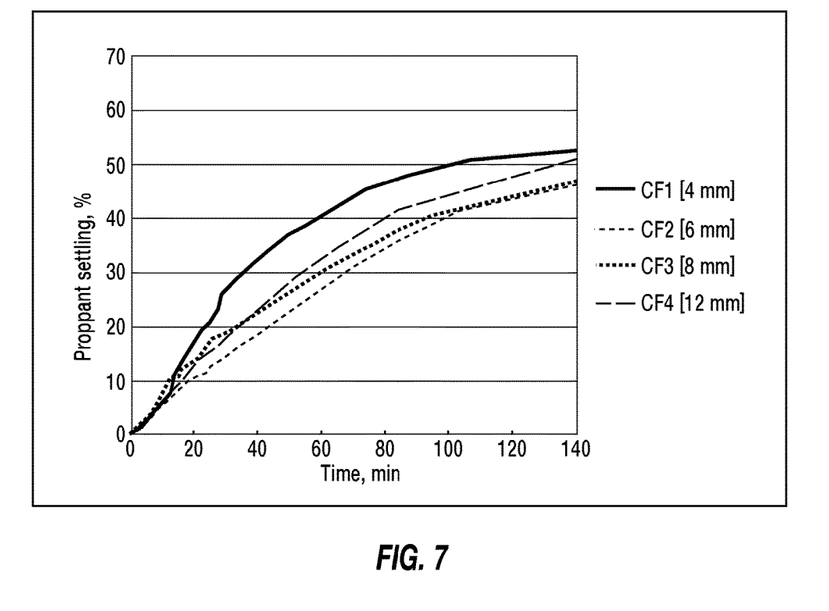
FIG. 7 schematically graphs the effect of fiber length on proppant settling in a treatment fluid with crimped mid temperature fibers.
Figure 8:
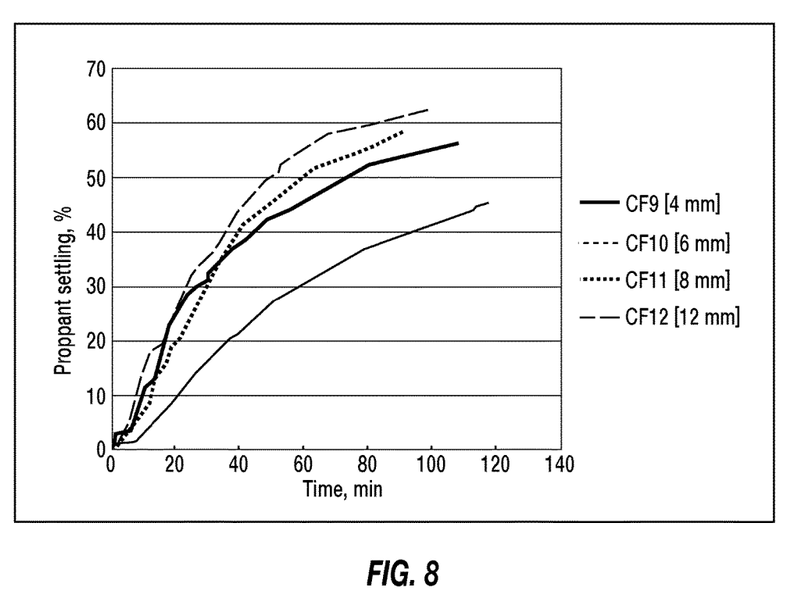
FIG. 8 schematically graphs the effect of fiber length on proppant settling in a treatment fluid with crimped low temperature fibers.
Figure 9:
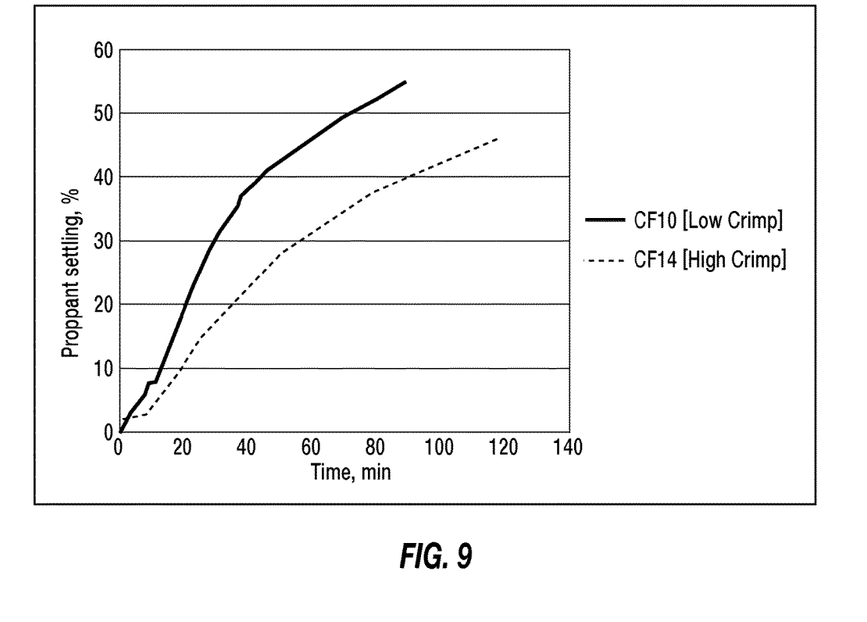
FIG. 9 schematically graphs the effect of crimp level on proppant settling in a treatment fluid with crimped low temperature fibers.

The results in FIGS. 5 and 6 indicate that 10 micron diameter fibers inhibit inhibited proppant settling to a greater extent than the 12 micron fibers. The results in FIGS. 7 and 8 indicate that 6 mm long fibers provided more or equivalent proppant settling inhibition relative to 4, 8 and 12 mm fibers. The results in FIG. 9 show that low crimp fibers provided better inhibition of proppant settling than high crimp fibers. The data generally show CF2 and CF10 (10 micron, 6 mm, low crimp) had the best settling inhibition characteristics.

Figure 10:
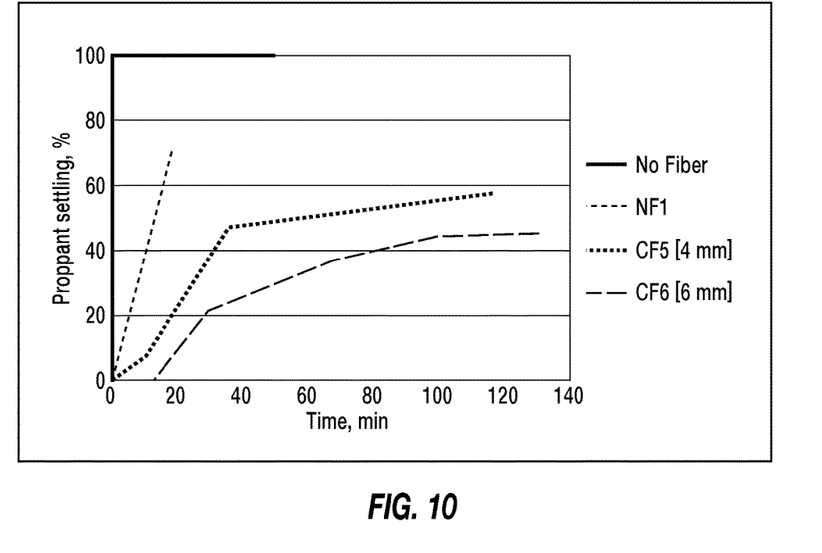
FIG. 10 schematically graphs the proppant settling in a slickwater fluid with various fibers.

Due to the difficulty of applying static proppant settling test in cylinder to slickwater due to immediate settling, experiments on proppant settling in narrow slot in static conditions could not be ran, however, experiments with fluid B that has a lower viscosity were ran to confirm the findings evidenced from the cylinder test with linear gel A. The results are available in FIG. 10 and confirm the tendencies observed.

Example 2

Fiber Bridging in Low Viscosity Guar Fluid

In this example, the fluid B was prepared, it contained a linear guar fluid, 2.4 g/L (20 ppt) guar, at 4.8 g/L (40 ppt) of fibers NF1, CF10 and CF14 without proppant. The bridge screening test results are presented in Table 2.

TABLE 2

Screening Bridge Testing.

| Flow rate, mL/min | Linear velocity, cm/s | Fiber NF1 (uncrimped) | Fiber CF10 (low crimp) | Fiber CF14 (high crimp) |
|---|---|---|---|---|
| 10 | 0.57 | Bridged | Bridged | Bridged |
| 50 | 2.86 | Bridged | Bridged | Bridged |
| 75 | 4.29 | Bridged | Bridged | Bridged |
| 100 | 5.72 | Bridged | Bridged | Bridged |
| 150 | 8.59 | Bridged | No Bridge | Bridged |
| 200 | 11.4 | Bridged | No Bridge | No Bridge |
| 250 | 14.3 | Bridged | No Bridge | No Bridge |
| 300 | 17.2 | Bridged | No Bridge | No Bridge |
| 350 | 20.0 | No Bridge | No Bridge | No Bridge |

The foregoing data show that fibers can be used in fracturing treatments using slickwater and linear gels having a low viscosity. With the appropriate fiber selection, bottom hole temperatures of 60-204° C. (140-400° F.) may be applicable. The fibers provide better proppant transport and reduced settling with reduced water requirements (higher proppant loading), reduced proppant requirements (better proppant placement) and reduced power requirements (lower fluid viscosity and less pressure drop). The fibers may increase proppant transport in a low viscosity fluid. The fibers may be degradable after placement in the formation. The fibers can be used in hybrid treatments such as heterogeneous proppant placement and/or pulsed proppant and/or fiber pumping operation modes.

While the embodiments have been illustrated and described in detail in the drawings and foregoing description, the same is to be considered as illustrative and not restrictive in character, it being understood that only some embodiments have been shown and described and that all changes and modifications that come within the spirit of the embodiments are desired to be protected. It should be understood that while the use of words such as ideally, desirably, preferable, preferably, preferred, more preferred or exemplary utilized in the description above indicate that the feature so described may be more desirable or characteristic, nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

We claim:

1. A treatment fluid, comprising:
   a carrier fluid having a viscosity lower than 50 mPa-s at a shear rate of 170 s$^{-1}$ and a temperature of 25° C.;
   proppant dispersed in the carrier fluid; and
   fibers dispersed in the carrier fluid the fibers being crimped staple fibers having 1 to 10 crimps/cm of fiber length, a crimp angle between 45 and 160 degrees and a mean diameter between 8 and 40 microns.

2. The treatment fluid of claim 1, wherein the carrier fluid is slickwater or brine.

3. The treatment fluid of claim 1, comprising from 0.06 to 1 kg/L of the proppant based on the total volume of the carrier fluid.

4. The treatment fluid of claim 1, wherein the fibers are dispersed in the carrier fluid in an amount effective to inhibit settling of the proppant in the carrier fluid.

5. The treatment fluid of claim 1, wherein the fibers are dispersed in the carrier fluid at a concentration that is insufficient to cause fiber bridging, wherein fiber bridging is defined as a condition whereby the fibers aggregate and form a plug that inhibits fluid flow through an orifice.

6. The treatment fluid of claim 1, wherein the fibers are dispersed in the carrier fluid at a concentration that is effective to inhibit settling of the proppant and that is insufficient to cause fiber bridging, wherein fiber briding is defined as a condition whereby the fibers aggregate and form a plug that inhibits fluid flow through an orifice.

7. The treatment fluid of claim 1, wherein the fibers are dispersed in the carrier fluid at a concentration that is effective to inhibit settling of the proppant and that is insufficient to cause fiber bridging during a small slot test comprising passing the treatment fluid comprising the carrier fluid and the fibers without proppant at 25° C. through a bridging apparatus comprising a 1.8 mm slot that is about 15 to 16 mm wide and 65 mm long at a flow rate equal to 15 cm/s, wherein fiber bridging is defined as a condition whereby the fibers aggregate and form a plug that inhibits fluid flow through the slot.

8. The treatment fluid of claim 1, wherein an effective concentration of the fibers to inhibit settling of the proppant is determined by comparing proppant accumulation in a narrow fracture flow test comprising pumping the treatment fluid at 25° C. through a 2 mm slot measuring 3 m long by 0.5 m high for 60 seconds at a flow velocity of 65 cm/s, relative to a reference fluid containing the carrier fluid and proppant only without the fibers.

9. The treatment fluid of claim 1, comprising from 1.2 to 12 g/L of the fibers based on the total volume of the carrier fluid.

10. The treatment fluid of claim 1, comprising less than 4.8 g/L of the fibers based on the total volume of the carrier fluid.

11. The treatment fluid of claim 1, wherein the fibers further comprise polyester.

12. The treatment fluid of claim 1, wherein the fibers further comprise polyester that undergoes hydrolysis at a temperature lower than 93° C., wherein the hydrolysis comprises heating 10 g of the fibers in 1 L deionized water until the deionized water has a pH lower than 3.

13. The treatment fluid of claim 1, wherein the fibers further comprise polyester that undergoes hydrolysis at a temperature between 93° C. and 149° C., wherein the hydrolysis comprises heating 10 g of the fibers in 1 L deionized water until the deionized water has a pH lower than 3.

14. The treatment fluid of claim 1, wherein the fibers are selected from the group consisting of polylactic acid, polyglycolic acid, copolymers of polylactic acid and polyglycolic acid, polyethylene terephthalate, polyester, polyamide, polycaprolactam and polylactone, poly(butylene) succinate, polydioxanone, glass, ceramics, carbon-based compounds, elements in metallic form, metal alloys, wool, basalt, acrylic, polyethylene, polypropylene, novoloid resin, polyphenylene sulfide, polyvinyl chloride, polyvinylidene chloride, polyurethane, polyvinyl alcohol, polybenzimidazole, polyhydroquinone-diimidazopyridine, poly(p-phenylene-2,6- benzobisoxazole), rayon, cotton, cellulose, rubber, and combinations thereof.

15. The treatment fluid of claim 1, further comprising a friction reducer.

16. A method to treat a subterranean formation penetrated by a wellbore, comprising:
  injecting a treatment fluid into the subterranean formation to form a hydraulic fracture system, wherein the treatment fluid comprises:
  a carrier fluid having a viscosity lower than 50 mPa-s at a shear rate of 170 s$^{-1}$ and a temperature of 25° C.; proppant dispersed in the carrier fluid; and crimped staple fibers dispersed in the carrier fluid, the fibers having 1 to 10 crimps/cm of fiber length, a crimp angle between 45 and 160 degrees and a mean diameter between 8 and 40 microns; and
  maintaining a rate of the injection of the treatment fluid to avoid bridging in the wellbore.

17. The method of claim 16, further comprising injecting a pre-pad, pad, tail or flush stage or a combination thereof.

18. The method of claim 16, wherein the treatment fluid comprises from 0.06 to 1 kg L of the proppant based on the total volume of the carrier fluid.

19. The method of claim 16, wherein the treatment fluid comprises less than 4.8 g L of the fibers based on the total volume of the carrier fluid.

20. The method of claim 16, wherein the fibers further comprise polyester and further comprising hydrolyzing the fibers downhole after the injection.

21. The method of claim 16, wherein the fibers are present in the treatment fluid in an amount effective to inhibit settling of the proppant, wherein proppant settling is measured by comparing proppant accumulation in a narrow fracture flow test comprising pumping the treatment fluid at 25° C. through a 2 mm slot measuring 3 m long by 0.5 m high for 60 seconds at a flow velocity of 65 cm/s, relative to a fiber-free reference fluid containing only the carrier fluid and the proppant.

22. A method to inhibit proppant settling in a treatment fluid circulated in a wellbore, the treatment fluid comprising the proppant dispersed in a carrier fluid having a viscosity lower than 50 mPa-s at a shear rate of 170 s$^{-1}$ and a temperature of 25° C., comprising:
  dispersing crimped staple fibers in the carrier fluid in an amount effective to inhibit proppant settling, the fibers having 1 to 10 crimps/cm of fiber length, a crimp angle between 45 and 160 degrees and a mean diameter between 8 and 40 microns; and
  maintaining a circulation rate to avoid bridging in the wellbore.

23. The method of claim 22, wherein the treatment fluid further comprises a friction reducer.

24. A system to treat a subterranean formation, comprising:
  a subterranean formation penetrated by a wellbore;
  a treatment fluid injection unit to supply a treatment fluid stage, comprising proppant in a carrier fluid having a viscosity lower than 50 mPa-s at a shear rate of 170 s$^{-1}$ and a temperature of 25° C., to the formation above a fracturing pressure to form a fracture system; and
  a fiber supply unit to introduce fibers into the treatment fluid, the fibers being crimpled staple fibers having 1 to 10 crimps/cm of fiber length, a crimp angle between 45 and 160 degrees and a mean diameter between 8 and 40 microns.

25. The system of claim 24, wherein the introduction of the fibers into the treatment fluid is in an amount suitable to inhibit proppant settling, and wherein the supply of the treatment fluid stage to the formation is at a flow rate sufficient to avoid inducing bridging.

* * * * *